2 Sheets—Sheet 1

N. CHAPMAN.
Temple-Roller Drilling-Machine.

No. 226,491. Patented April 13, 1880.

Witnesses
Jos. P. Livermore
L. F. Connor

Inventor
Nathan Chapman
by Crosby & Gregory
Attys

N. PETERS, PHOTO-LITHOGRAPHER, WASHINGTON, D. C.

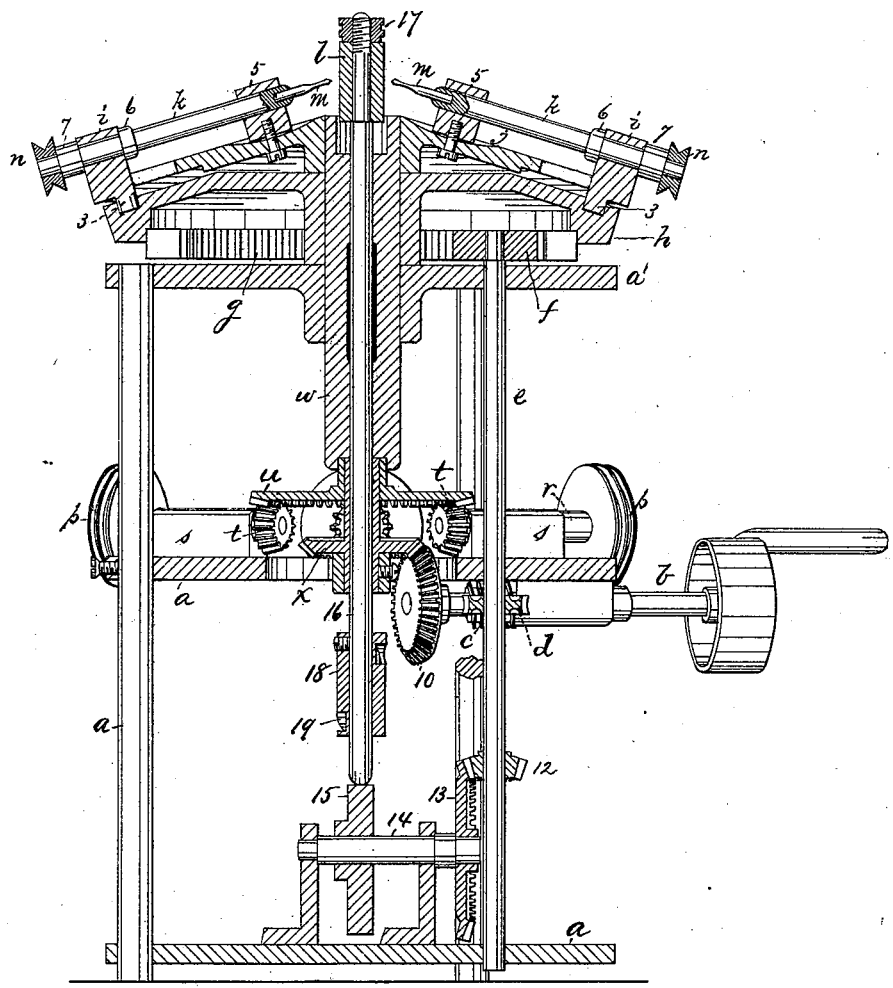

UNITED STATES PATENT OFFICE.

NATHAN CHAPMAN, OF MILFORD, MASSACHUSETTS.

TEMPLE-ROLLER-DRILLING MACHINE.

SPECIFICATION forming part of Letters Patent No. 226,491, dated April 13, 1880.

Application filed January 5, 1880.

*To all whom it may concern:*

Be it known that I, NATHAN CHAPMAN, of Milford, county of Worcester, and State of Massachusetts, have invented an Improvement in Temple-Roller-Drilling Machines, of which the following description, in connection with the accompanying drawings, is a specification.

This invention relates to mechanism for drilling holes in loom-temples for the insertion of the temple-teeth, and is an improvement on United States Patent No. 197,210, November 20, 1877, to which reference may be had; and the invention consists, essentially, in the combination, with a temple-roller-carrying shaft to move the temple-roller longitudinally, of a radial series of drills and means to rotate and reciprocate the same simultaneously, whereby all the holes of any annular series of holes may be drilled at once.

By imparting to the temple-roller-carrying shaft a slight axial motion as it is being moved longitudinally—a motion in all equal to but substantially half a rotation—the holes of each annular series of holes will be made to fall opposite the spaces between the holes of each preceding annular series of holes.

Figure 1:
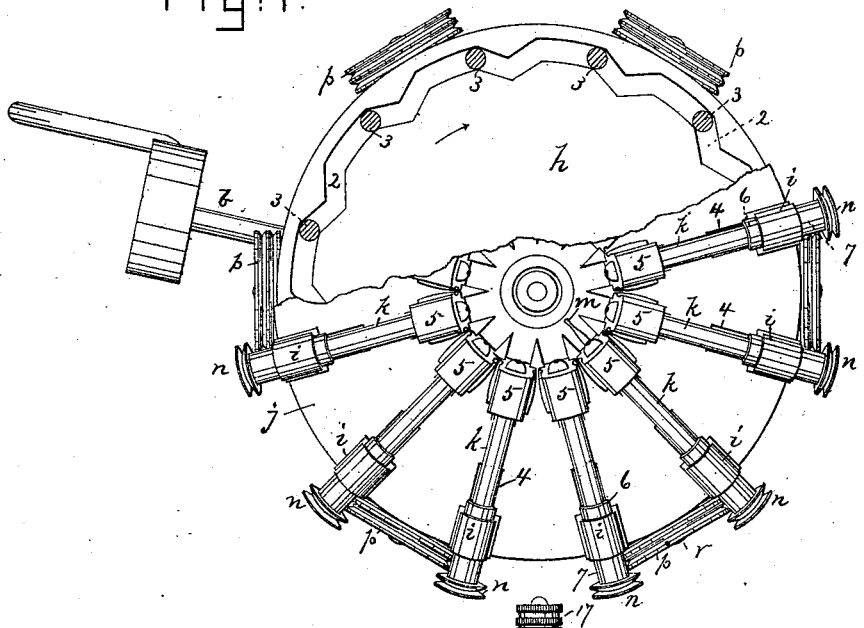
Figure 2:
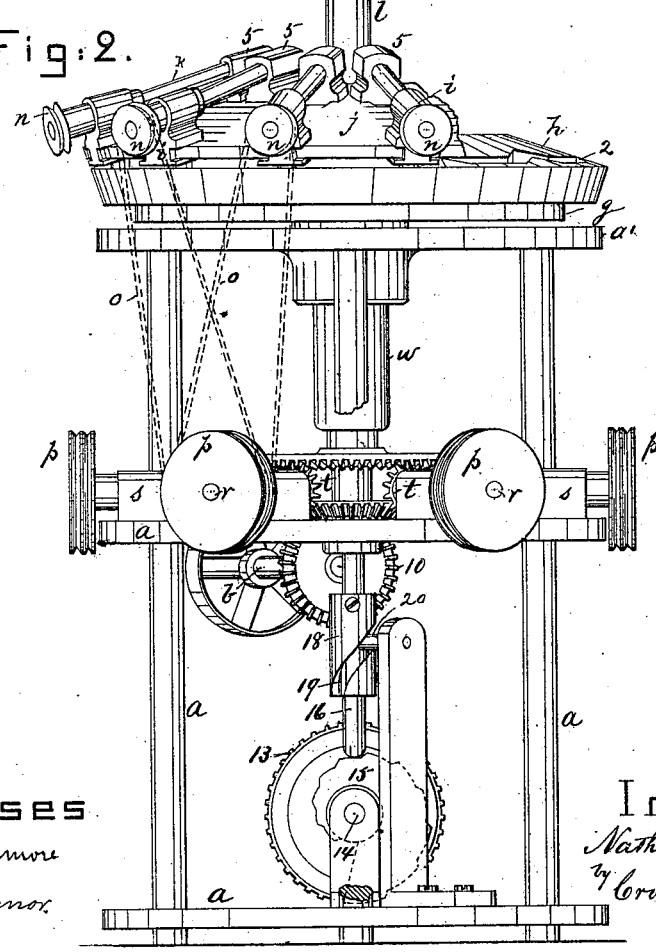

Figure 1 represents, in plan view, a temple-roller-drilling machine, part of it being broken away to show parts beneath the drill-carrying plate, containing my invention; Fig. 2, a side elevation thereof, part of the drills being broken away, and Fig. 3 a vertical section of Fig. 2.

The frame-work $a$ is of suitable shape to sustain the working parts. The main shaft $b$ of the machine, driven in any usual manner, has upon it a worm, $c$, which engages a worm-gear, $d$, on the vertical shaft $e$, provided at its upper end with a toothed gear, $f$, which engages the teeth of and drives the internally-toothed ring $g$, located above the top plate, $a'$, of the machine. This toothed ring has connected with it a cam-disk, $h$, having a waved cam-groove, 2, which receives in it pins 3 of the carriages $i$, fitted to slide backward and forward in slots or ways 4 in the drill-carrying plate $j$, the said plate, near its open center, having an annular series of bearings, 5, to hold the forward ends of the drill-shafts $k$, the said shafts sliding longitudinally therein as the carriages are moved radially toward and from the temple-roller $l$ being drilled. These shafts have upon them collars 6 7, both of which will preferably be made adjustable thereon, between which collars the shafts are embraced by the upper parts of the carriages.

Adjusting the collars enables the operator to control the exact position of the drills in their forward position without adjusting the drills in their shafts.

The drills $m$ are held in sockets at the ends of the shafts by set-screws or otherwise. Each drill-shaft has upon it at the rear of the carriages a whirl, $n$, which is connected by a band, $o$, (shown in dotted lines, Fig. 2,) with one of the series of drill-driving pulleys $p$, each of said pulleys being preferably made double or double-scored, so as to drive two drills. These pulleys $p$ are fixed upon shafts $r$ in suitable bearings $s$ on the frame-work, and each of the said shafts has at its inner end a bevel-gear, $t$, which is engaged and driven by a bevel-toothed disk, $u$, which takes its upper bearing at the lower end of a sleeve, $w$, depending from the plate $a'$.

Connected with the disk $u$ is a bevel-gear, $x$, which is engaged and driven by the bevel-gear 10 on the main shaft $b$.

The shaft $e$, before referred to, has upon it a bevel-pinion, 12, which engages a bevel-toothed disk, 13, on the shaft 14, which carries the stepped cam 15, that at the proper times during its rotation acts upon and lifts the temple-roller-carrying shaft 16, which, at its upper end, will have a suitable shoulder to form a seat for the lower end of the temple-roller or wooden shell $l$, it being held down upon the said shaft and against rotation thereon by suitable set-nuts or keys 17. At or near its lower end this carrying-shaft 16 has attached to it a collar, 18, provided with a spiral slot or groove, 19, in which is entered a stationary pin, 20.

As the cam 15 is rotated it will move the temple-roller-carrying shaft and roller vertically in an intermittent manner, as will be obvious from the shape of the said cam, permitting the roller to remain at rest for a sufficient space of time to allow all the drills to enter and retire from it, making at one operation all the holes of each annular series of holes; and as the said shaft 16 is so gradually elevated or moved longitudinally the pin 20, acting in the groove 19, causes the said shaft to be slightly turned axially, to thereby enable the drills, when making the holes for an annular series, to enter the roller below and opposite the spaces between the holes of a preceding annular series of holes.

In this machine I am enabled to, in a very simple and expeditious manner, drill the temple-rollers, and each radially-operating drill is made to counterbalance the pressure of the drill opposite it, thereby relieving the temple-roller-carrying shaft of strain and friction, thereby obviating the employment of independent supports. The cam-groove 2 and the steps of the cam 15 are so timed with relation each to the other that while the drills are drilling and retiring the temple-roller-carrying shaft is at rest, and vice versa; and it will be noticed that both of these cams derive their movement from the same shaft, thereby making a direct and simple connection between the main cams of the machine.

I claim—

1. In a temple-roller-drilling machine, the temple-roller-carrying shaft and a cam to move it longitudinally, combined with a radially-movable series of drills and means to operate them to simultaneously drill an annular series of holes in the said roller, substantially as described.

2. In a temple-roller-drilling machine, the roller-carrying shaft provided with a grooved hub, and a cam to move the shaft longitudinally and the pin to move it axially, combined with a radially-placed series of drills and means to rotate and move the said drills radially, as described, to simultaneously drill an annular series of holes in the temple-roller, the axial movement of the roller insuring the placing of the holes of each adjacent annular series of holes in different longitudinal lines, substantially as set forth.

3. The drill-carrying plate, its series of bearings, the rotatable cam $h$, grooved as set forth, and means to operate it continuously in one direction, combined with the carriages and series of radially-placed drill-stocks and drills, to operate substantially as described.

4. The radially-placed series of drill-shafts provided with whirls, the series of shafts $r$, their pulleys and bevel-gears, and connecting bands or belts, combined with the bevel-disk to turn the shafts $r$ and means to operate the said bevel-disk, substantially as described.

5. The cam-grooved plate $h$, its connected toothed gear, the gear $f$, and shaft $e$, the shaft 14, cam 15, and means to operate the said shaft 14 from the shaft $e$, combined with the temple-roller-carrying shaft 16, all substantially as and for the purpose described.

In testimony whereof I have signed my name to this specification in the presence of two subscribing witnesses.

NATHAN CHAPMAN.

Witnesses:
 WM. F. DRAPER,
 F. J. DUTCHER.